(12) United States Patent
Destoumieux

(10) Patent No.: US 6,968,639 B2
(45) Date of Patent: Nov. 29, 2005

(54) EAR TAG FOR MARKING ANIMALS WITH ORGANIC SUBSTANCE SAMPLING SYSTEM

(75) Inventor: Jean-Jacques Destoumieux, Toulouse (FR)

(73) Assignee: Chevillot S.A., (FR)

( * ) Notice: Subject to any disclaimer, the term of this patent is extended or adjusted under 35 U.S.C. 154(b) by 0 days.

(21) Appl. No.: 10/473,476

(22) PCT Filed: Apr. 2, 2002

(86) PCT No.: PCT/FR02/01127

§ 371 (c)(1),
(2), (4) Date: Sep. 26, 2003

(87) PCT Pub. No.: WO02/080661

PCT Pub. Date: Oct. 17, 2002

(65) Prior Publication Data

US 2004/0103567 A1    Jun. 3, 2004

(30) Foreign Application Priority Data

Apr. 4, 2001    (FR) .................................. 01 04570

(51) Int. Cl.⁷ ............................................. A01K 11/00

(52) U.S. Cl. ....................................... 40/301; 119/858

(58) Field of Search .......................... 40/300, 301, 302; 435/183, 270, 288.2; 422/243, 255, 26; 119/858

(56) References Cited

U.S. PATENT DOCUMENTS

| 6,509,187 B2 * | 1/2003 | Brem ...................... 435/288.2 |
| 2004/0093775 A1 * | 5/2004 | Brem .......................... 40/301 |

FOREIGN PATENT DOCUMENTS

| DE | 19740429 A1 | 9/1997 | |
| EP | 1060662 A1 | 12/2000 | |
| EP | 1060662 B1 | 9/2004 | |
| FR | 2829359 A1 * | 3/2003 | .......... A01K 11/00 |
| WO | WO 9613214 A1 * | 5/1996 | .......... A61B 10/00 |
| WO | WO9961882 | 5/1998 | |
| WO | WO 02/39810 A2 * | 5/2002 | |
| WO | WO 02/078431 | * 10/2002 | .......... A01K 11/00 |

* cited by examiner

Primary Examiner—Cassandra Davis
(74) Attorney, Agent, or Firm—Blakely Sokoloff Taylor & Zafman

(57) ABSTRACT

An ear tag for marking animals includes a female portion consisting of a female head optionally borne by or formed in a first panel, a male portion consisting of a male punch optionally borne by or formed in a second panel, identifying means being borne by at least one of the male or female portions. The male punch is configured in two separable elements, one of which is housed in the female head and the other forms an organic matter sampling device during the passage of the male punch through the ear of an animal, which is moveable in an axial channel thereof and is withdrawn through the panel of the male portion after fastening the tag onto the animal's ear.

16 Claims, 5 Drawing Sheets

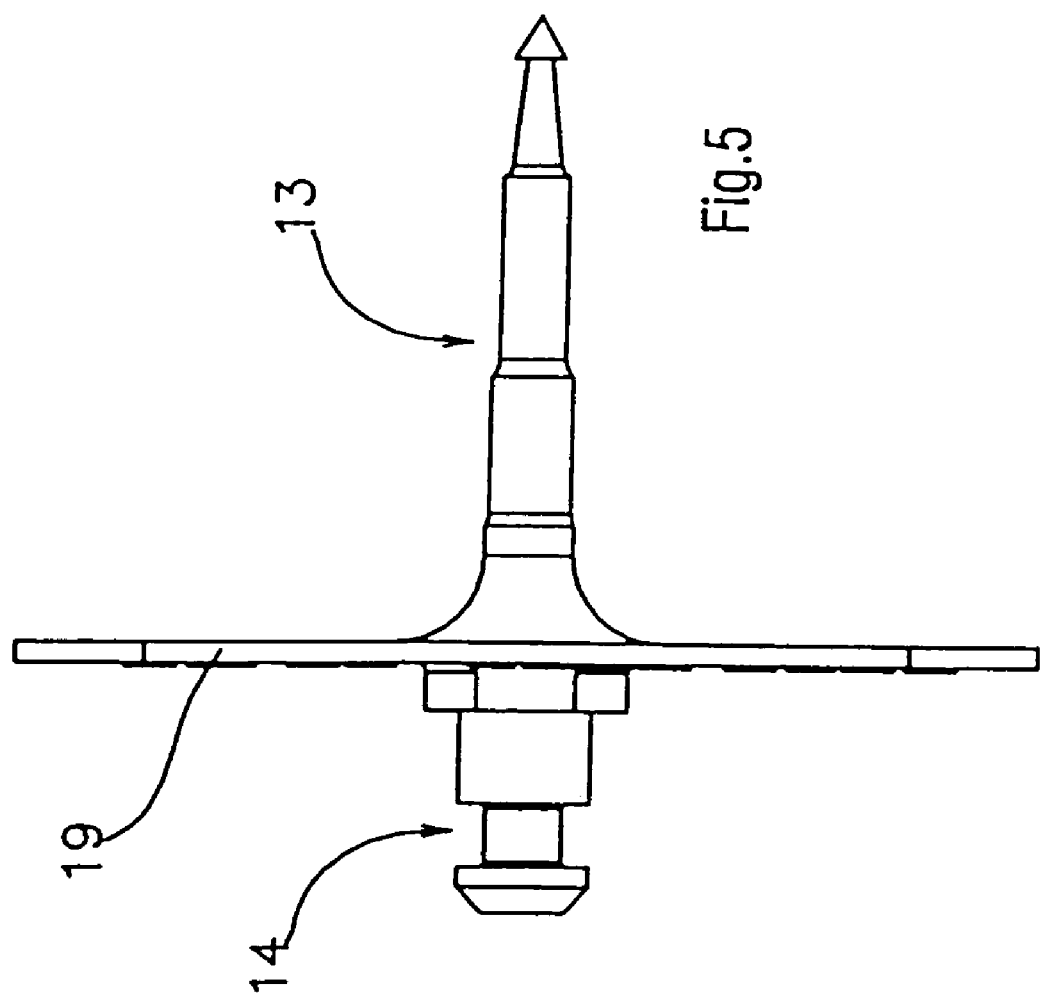

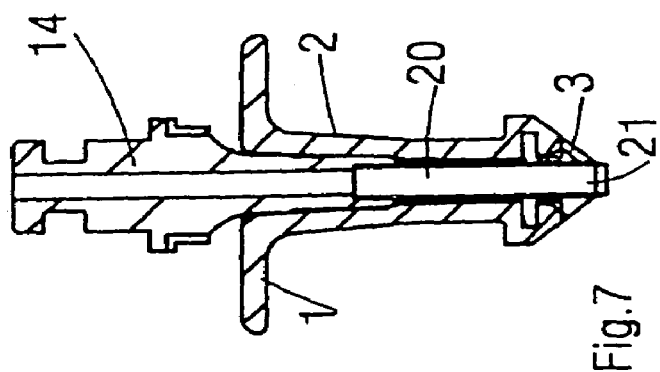
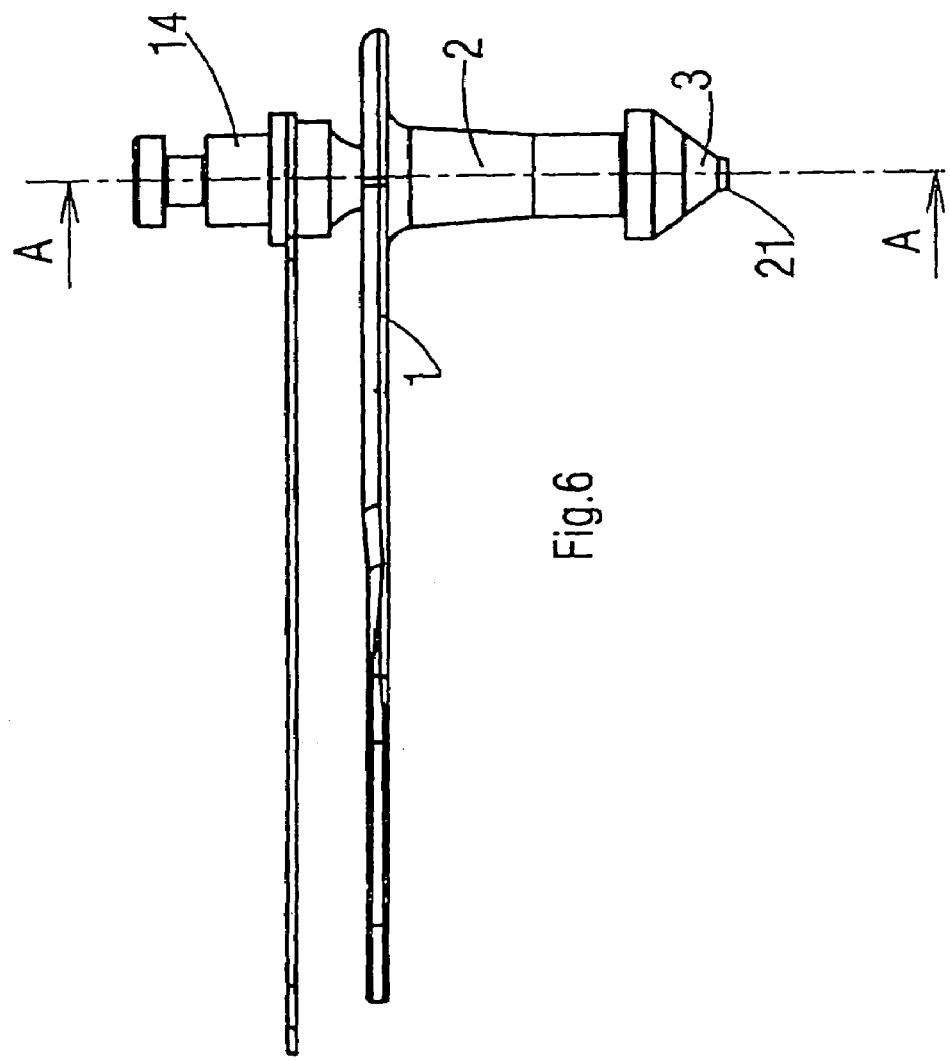

EAR TAG FOR MARKING ANIMALS WITH ORGANIC SUBSTANCE SAMPLING SYSTEM

BACKGROUND OF THIS INVENTION

Ear tags generally comprise a wall with a female head and a wall with a male punch, said walls carrying identifying information. As they are affixed, by means of pliers, the male punch pierces the animal's ear and is housed in the female head where it is secured so that it cannot be separated from the female head. Necessary rigidity is provided by the pin of the pliers, which is housed in the hollow shaft of the punch. This punch is generally closed.

Generally, the female heads providing the best guarantee of inviolability for the completed assembly, and thus the inviolability of the marking achieved, are closed heads.

Closed heads have only one orifice, that through which the punch passes. This is secured in position, by known means, with a radial collar behind its pointed end, distal in relation to the tag of which it forms a non-distinct part.

The collar of the punch is locked into the female head, which is provided with ribs, teeth or other means that do not prevent the penetration of the punch but do prevent its withdrawal.

In a particular embodiment of the ear tag, the closed female head is made of a synthetic material, duplicate moulded on the wall and having a Shore hardness such that is difficult to pierce or cut it to perform any procedure on the end of the punch intended to remove it from the head.

At present, the ear tags that are most often used are tags with a closed head.

Tags with an open head are also available on the market, said tags each display an orifice through which the nose of the punch, with its collar, penetrates into an open tubular receptacle, that is to say having an orifice at its free end.

The use of ear tags for marking animals is a widespread practice in all livestock-breeding countries to ensure the tracking of bred animals destined for human consumption.

These markings and the data relating to the animal are generally centralised in computerised data banks that can be accessed for updating or information retrieval by all concerned: breeders, fatteners, veterinary services etc . . . right down to the distribution networks.

The pursuit of maximum security in the identification of the animal leads to the sampling of organic matter, which may be stored with a view to DNA analysis.

Patent WO 99 61 882 attempts a solution to this effect, and proposes a device and a procedure intended to enable a sample of organic tissue to be taken. This patent describes a receptacle for the sample and a sampling tool in the form of a cutting die that locks into the receptacle with the sampled organic matter.

The receptacle and the punch may be combined with an ear tag and carry the same markings.

Although it is indicated in this patent that it is possible to accomplish the sampling at the same time as affixing the ear tag, no technical information is provided to this effect, and it is not evident that this is possible at one and the same time.

In any case, since the sampling tool must necessarily be borne by the punch on one jaw of the ear-tagging pliers and the receptacle by the other jaw of the pliers, this is only feasible for tags with open heads that are capable of being traversed by the punch holder on the pliers and the sampling tool.

It is known that this type of tag is not very secure and is therefore little used.

Patent DE 197 40 429 describes a procedure and device similar to the preceding one, which is also limited to the use of an open-headed tag.

Patent EP 1 060 662 describes an ear tag of the above-mentioned type wherein the male punch has at its end a circular cutting means which is detachable from the punch and is housed in a capsule borne in a perforation emerging at the back of the female head.

The device according to this patent is not applicable to ear tags with a closed head.

Furthermore, the substantial diameter of the cutting element makes the penetration of the male punch into the ear wall difficult.

SUMMARY OF THE INVENTION

The object of the present invention is to produce an ear tag for marking animals with a system that takes and retains a sample of organic matter and enables the tag to be affixed and the sampling to be carried out in a single operation. It is possible for said tag to be optionally of the open- or closed-headed type.

As both the sampling and the marking by affixing the ear tag take place at the same time, the risk of wrongly allocating a sample is eliminated, all the more so since according to the invention the male punch that fixes the tag in the female head is directly involved in the sampling procedure.

To this end, the ear tag for marking animals according to the invention, comprising a female portion consisting of a female head optionally borne by or formed in a first panel, a male portion consisting of a male punch optionally borne by or formed in a second panel, identifying means being borne by one at least of the male or female portions, is characterised essentially in that the male punch is configured in two separable elements, of which one is locked into the female head and the other is a device for sampling organic matter as the male punch passes trough the ear of an animal and that is capable of moving freely in an axial channel of the former and is withdrawn through the panel of the male portion after the tag is affixed to the animal's ear.

In another aspect of the invention:
the ear tag comprises a part with the female portion and a part with the male portion; said parts bearing identifying means;
the male punch is housed in a secure manner in the female head after passing through the ear;
the male punch is pierced by an axial channel emerging in the panel and at the end of the punch,
the end of the punch forms a cutting die;
a removable prick punch passes through the channel in the male punch;
the removable prick punch has a tip for piercing the organic matter and a means for holding the matter punched out by the cutting die and pierced by its tip, so that the cutting and the piercing are carried out as the male punch moves towards the female head, and after these have been locked together, the removable prick punch may be extracted from the channel in the male punch carrying with it the organic matter that has been cut out.

In yet another aspect of the invention, the end of the male punch is provided with an end piece pierced through the centre, said end piece having a frustoconical exterior and a frustoconical cavity axial to the channel in the punch, the circular edge 12 of said end piece being formed by the junction of the two conic frustums defining a ridge 12 that forms a cutting die.

In another aspect of the invention, the tip 15 of the removable prick punch in the channel of the punch has a tip 15 joined to a necked portion 16 behind said head by a collar 17 orthogonal to the axis of the shaft of the prick punch.

In another aspect of the invention, the tip 15 of the prick punch, when fully inserted, projects from the ridge 12 of the cutting die end piece.

In another aspect of the invention, the prick punch passing through the punch, is provided, at the end opposite to the tip, with a mounting part 14 for affixing it to one of the jaws of an applicator pliers on the opposite end to the tip.

In another aspect of the invention, the wall of the internal frustum of the end piece forms an angle of between 40° and 60°, and preferably 45°, with the transversal axis.

In another aspect of the invention, the ear tag comprises a part with the female head and a part with the male portion, said parts bearing identifying means, the male punch being housed in a secure manner in the female head after passing through the ear, characterised essentially in that:

the male punch is pierced by an axial channel emerging through the panel and the punch;

the organic matter sampling device, mounted in a manner that enables it to move freely within the channel of the male punch and being separable therefrom, comprises a hollow needle at the end a mounting for fixing of said sampling device on one of the jaws of an applicator pliers.

In another aspect of the invention, the sampling device has a panel (19) provided with identifying means corresponding to those on the male and female portions of the tag.

In another aspect of the invention, at least one of the male or female parts presents a panel (1), the identifying means associated with said portion being borne on said wall.

In another aspect of the invention, the sampling device has on its upper part means to connect it, whether in a secured manner or not, with a receptacle in which the end of the sampling device and the sample of organic matter is housed.

In another aspect of the invention, the receptacle in which is housed at least the end of the sampling device, carries an identifying means.

In another aspect of the invention, the identifying means are visual means. These identifying means may thus take the form of an inscription in alphabetic or numerical characters, or even a bar code. The various inscriptions may be identical, or different but related.

In another aspect of the invention, one at least of the identifying means consists of a transponder, comprising electronic identification means, for example in the form of an electronic number, attached to one of the male or female portions, and/or to the panel (19) and/or to the receptacle.

The transponder could, for example, be embedded in the body of one of the parts of the male or female portions or in the body of the panel (19) or in the body of the receptacle, but the transponder may be attached to the corresponding part of the male or female portions by any other means, for example by adhesive bonding.

The transponder could be provided with a ROM- or EPROM-type memory into which the electronic number could be entered, and an appropriate transmitting circuit. The information contained in the memory, in this case the number and possibly other information of use in the envisaged application, are read remotely by an appropriate reading device.

BRIEF DESCRIPTION OF THE DRAWINGS

Other advantages and characteristics of the invention will become apparent from the following description of a form of embodiment of the invention, given as a non-limiting example and illustrated by the attached drawings, in which:

FIG. 5 is a view of the prick punch according to another embodiment;

FIG. 6 is a view of another form of embodiment of the male portion of the tag according to the invention;

FIG. 7 is a sectional drawing of FIG. 6 following the line AA.

DETAILED DESCRIPTION OF A PREFERRED EMBODIMENT OF THE INVENTION

Figure 1:
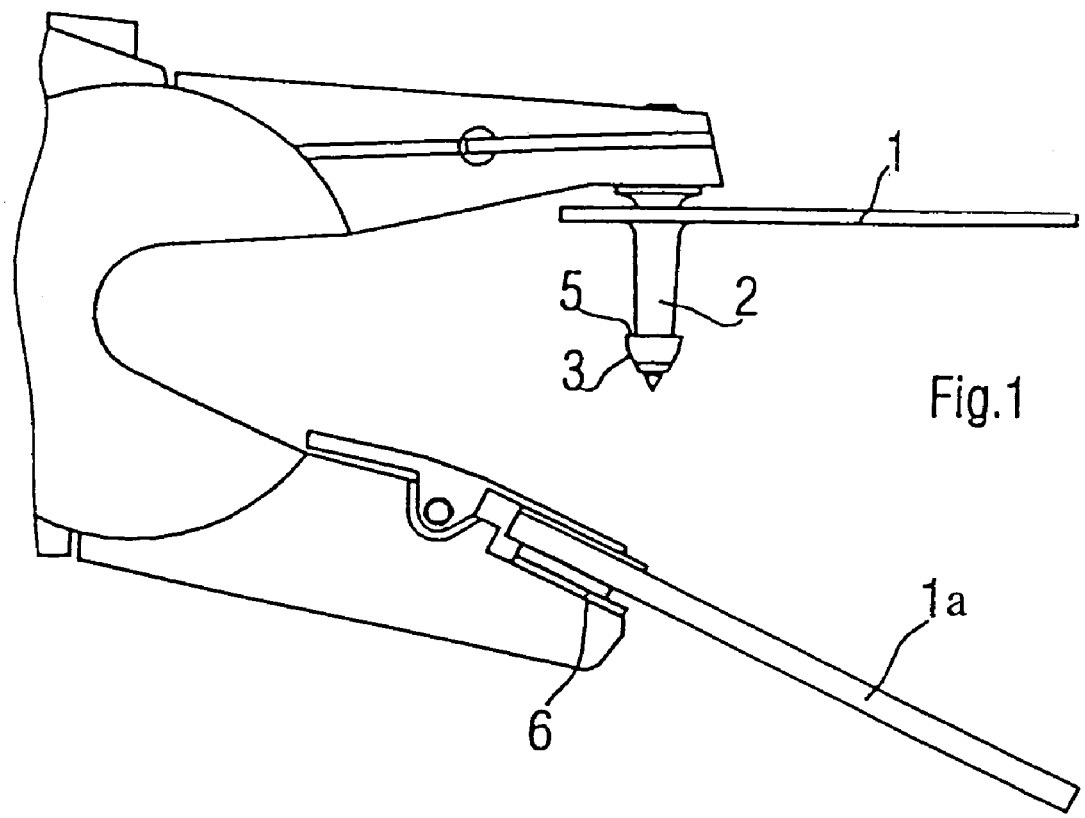
FIG. 1 is a view of the open jaws of a pair of ear-tag applicator pliers.

FIG. 1 represents a partial view of a pair of ear tag applicator pliers.

The ear tag is in two portions:

one so-called male portion, comprising a first wall or panel 1 bearing identifying information for the animal and a vertical male punch the nose 3 of which is provided with a shoulder 5, and a female portion with a second wall or panel 1 a bearing identical information to the wall of the male portion and a hollow head 6 that may be either open or closed.

In FIG. 1 the female head 6 is located in a receptacle in the jaw, and the male portion is attached to the other jaw of the pliers.

The female head 6 comprises known means for locking the male punch in place.

According to the invention, the male punch is made up of first and second separable punch elements 2 and 13, one within the other. The first punch element 2, passes through the ear wall and is housed in the female head 6 to firmly fasten the two components of the tag together, and wherein the second punch element 13 is carried along with the first punch element 2 to also pass through the ear wall and retain organic matter. This second punch element is, herein, generically called the sampling device.

As the sampling device 13 is separated from the first punch element 2, which occurs when the first punch element 2 is in the female head 6 of the tag, the organic matter is withdrawn with the sampling device 13 and may thereafter be stored for analysis, for example, to establish the DNA of the animal concerned.

Advantageously, one of the two parts of the punch acts as a cutting die that cuts out a portion of the organic matter, and the sampling device retains the said portion and enables it to be extracted.

Preferably, the part forming the cutting die is that which is secured in the female head by a known means.

Figure 4:
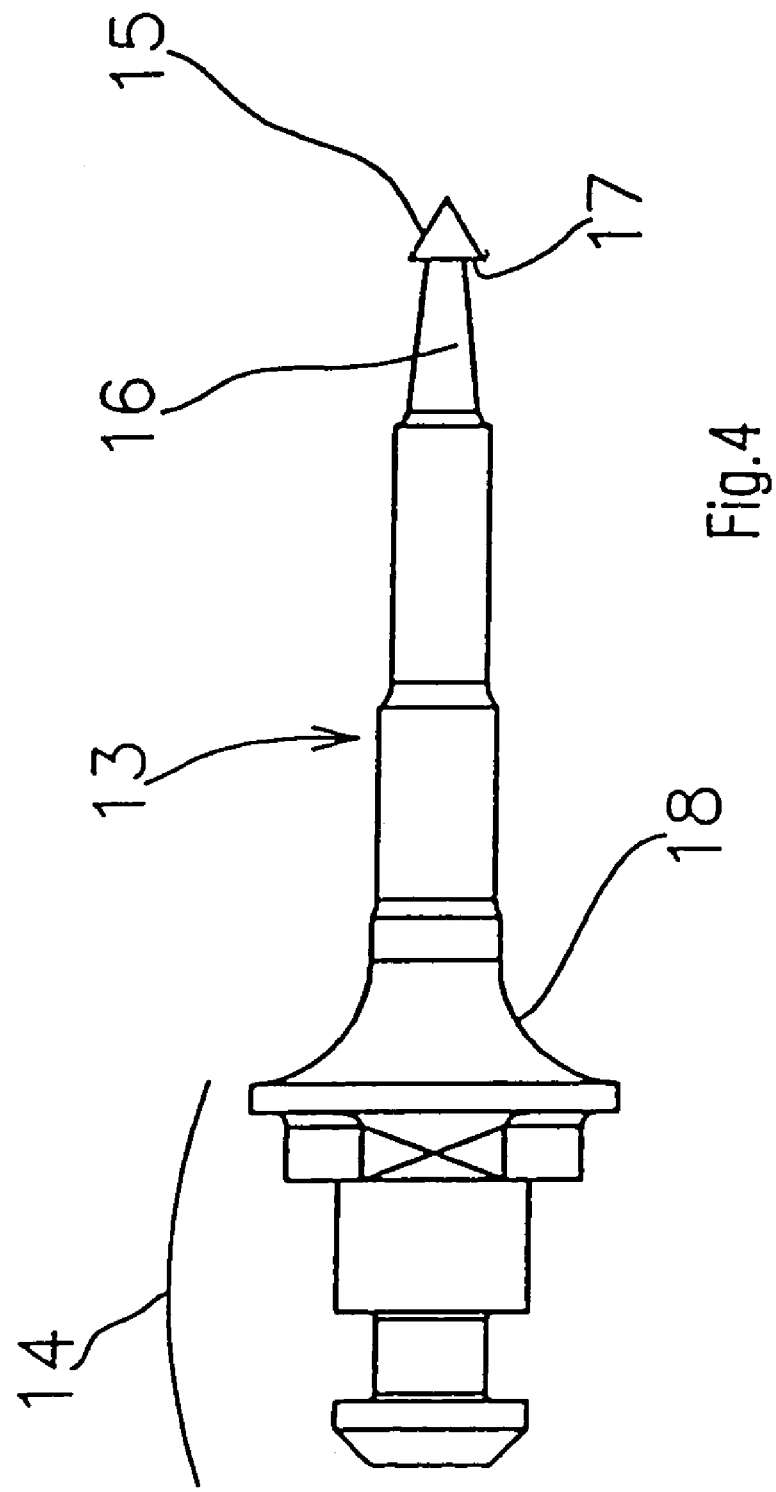
FIG. 4 is a view of the prick punch.

As represented in the drawings, the first punch element 2 is composed of a cylindro-conical shaft that is pierced by an axial channel, said channel emerging at one end of the first punch element 2 at the nose 3, and the sampling device 13 is composed of a prick punch represented in a more detailed manner in FIGS. 4 and 5.

The shoulder 5 of the nose 3 enables the first punch element 2 to be secured in the female head 6 by any known means.

Figure 2:
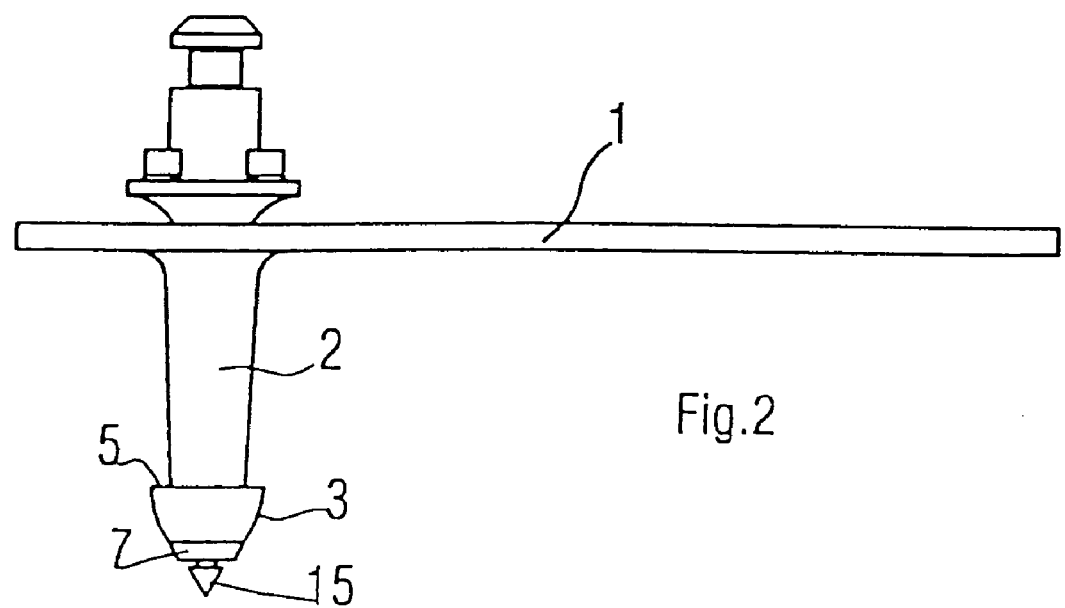
FIG. 2 is a view of the tag with the male punch according to the invention, and a prick punch.

The end of the nose 3 of the first punch element 2 is provided with an end piece 7 (FIG. 2) that is duplicate moulded.

Preferably this end piece 7 is made of metal.

Figure 3:
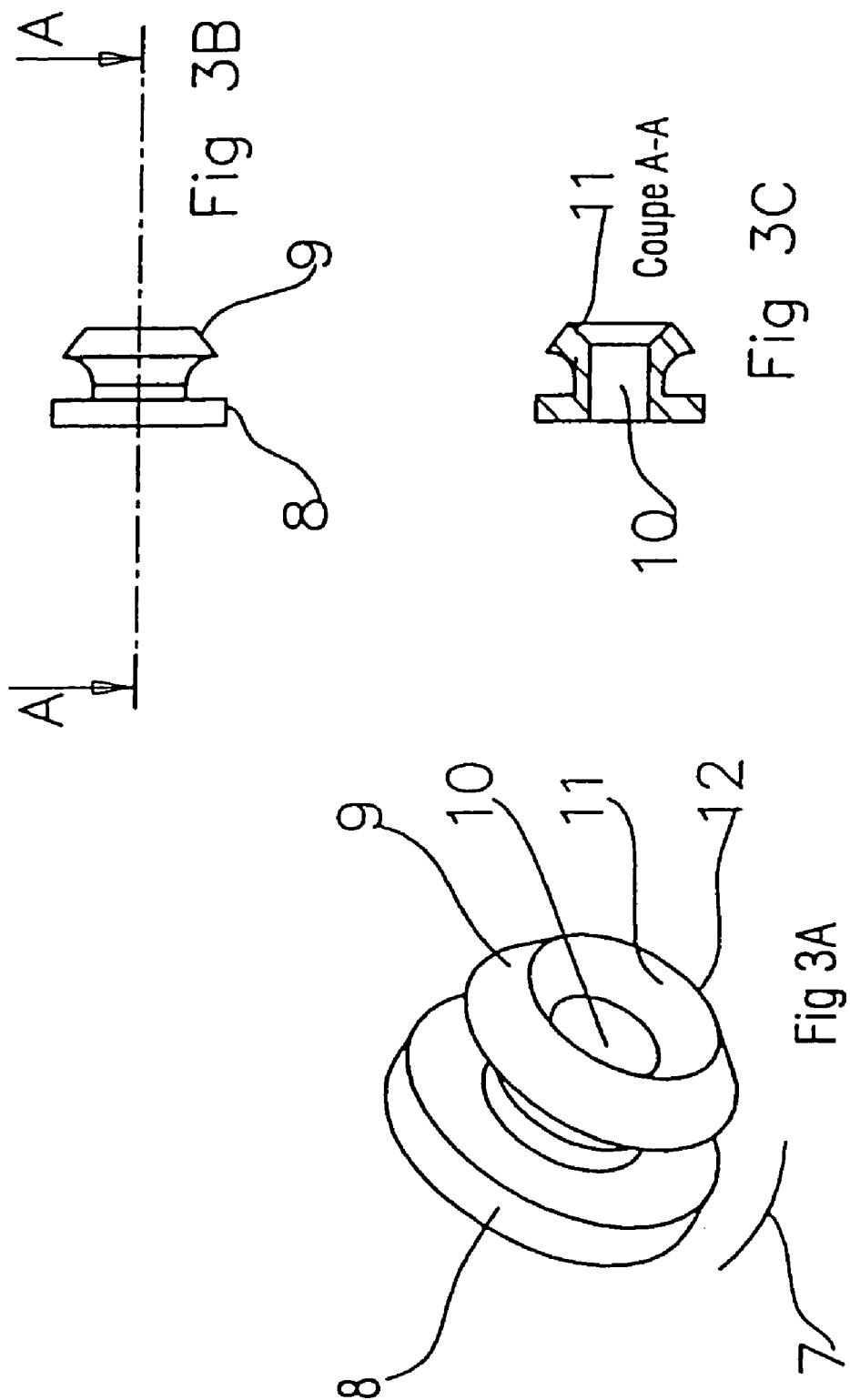
FIGS. 3a to 3c represent the end piece of the nose of the male punch.

FIGS. 3A, 3B, 3C represent the end piece 7 having a flange 8 embedded in the material of the first punch element 2, and one external frustoconical end.

The end piece 7 is pierced by a central channel 10 that prolongs the internal channel of the punch axially.

The end piece 7 presents an orifice 11 in the form of a frustoconical cavity.

The frustoconical wall 9 and the frustoconical wall of orifice 11 are oriented in opposite directions and define a circular ridge 12 or edge forming a cutting die. The sampling device or prick punch 13 comprises a metal shaft, the so-called upper end of which presents known means 14 for mounting same in the relevant jaw of the pliers and the other end of which presents a tip 15.

Between the components 14 and the tip 15, the shaft of the prick punch 13 is housed in the axial channel of the first punch element 2, the components 14 projecting from the wall 1 and the tip 15 protruding from the end piece 7 or coming level with the ridge 12 of the end piece 7.

Preferably, the shaft of the prick punch 13 presents behind the tip 15 a necked part 16 of smaller diameter than the tip and the upper portion of the shaft.

A shoulder 17 behind the tip 15 retains the organic matter through which the tip 15 passes.

The tip 15 being of slightly smaller diameter than the axial channel of the first punch element 2 and its end piece 7, as the prick punch 13 is withdrawn the matter lodges itself around the necked part 16 in the axial channel.

The upper part of the shaft of the prick punch 13 is provided with a conical portion 18 that limits its penetration in the axial channel of the first punch element 2, so that as the tag is affixed, the tip 15 projects slightly from the ridge 12 of the end piece and the collar 17 is able to enter into the organic matter.

In operation, when the first punch element 2 comes into contact with the ear wall, the ridge 12 of the end piece 7 cuts a piece out of said ear wall while the tip 15 pierces through it and fixes it to the shoulder 17.

After the first punch element 2 has penetrated into the female head 6 and the pliers have been withdrawn, the user extracts the prick punch 13 from the axial channel of punch 2 and can store the prick punch 13 with the organic matter.

Said storage may take place in a tubular receptacle, with or without internal preserving material, of a diameter corresponding to that of the upper part of the prick punch 13, thus enabling the two to be wedged together.

Any other method and means of securing the receptacle onto the prick punch 13 may be used, for example a threaded joint with threads on the prick punch 13 and inside the container.

FIG. 5 shows an embodiment of the prick punch 13 that is provided with a wall or panel 19 bearing the same, or related, identification details as the ear tag, located between the prick punch 13 and the components 14 for fastening it to the jaw of the pliers.

FIGS. 6 and 7 show another embodiment of the ear tag according to the invention, in which the first punch element 2, pierced by an axial channel emerging in the wall 1 and at the end 3 of the first punch element accommodates an organic matter sampling device that is capable of moving freely in the channel of the first punch element 2 and separable therefrom, which comprises a hollow needle 20 linked to the fastening means 14 of said sampling device on one of the jaws of the applicator pliers.

Advantageously, the end of the hollow needle 20 is sharp and protrudes, as shown at 21, from the end 3 of the first punch element 2 so that it pierces the ear wall, and cuts out and retains the organic matter during the passage of the first punch element 2 towards the female head 6.

After fastening the male portion into the female portion, the sampling device 13 is extracted from the channel of the first punch element 2 through the wall 1 of the male portion and in a backward direction in relation to the end 3 of first punch element 2 locked in the female head 6.

It is clear that various adjustments and modifications from equivalent technologies may be made to the present invention without thereby departing from the scope of the present invention as defined in the attached claims.

What is claimed is:

1. An ear tag for marking animals comprising a female portion including a female head optionally borne by or formed in a first panel, a male portion including a male punch optionally borne by or formed in a second panel, identifying means being borne by at least one of the male or female portions, wherein the male punch is formed by first and second separable punch elements, the first punch element has an end, which in use, becomes housed in the female head to fasten the ear tag onto the ear of an animal and the second punch element forms an organic matter sampling device during the passage of the male punch through the ear of an animal, the second punch element is moveable in an axial channel in the first punch element and is withdrawn from said axial channel through the second panel of the male portion after fastening the tag onto the animal's ear.

2. An ear tag for marking animals according to claim 1, wherein;
   the axial channel extends through the second panel and the first punch element;
   said end of the first punch element forms a cutting die;
   the second punch element is a removable prick punch engaged through the axial channel in the male punch;
   the removable prick punch has a tip for piercing the organic matter and a means for holding matter punched out by the cutting die and pierced by said tip, so that cutting and piercing are carried out as the male punch moves towards the female head, and after the first punch element and female head have locked together, the removable prick punch may be extracted from the axial channel carrying with it the organic matter that has been cut out.

3. An ear tag according to claim 2 wherein the end of the first punch element is provided with an end piece pierced with a bore therethrough, said end piece having a frustoconical exterior and a frustoconical cavity axial to the axial channel, the circular edge of said end piece being formed by a junction of the two conic frustums thereby defining a ridge that forms the cutting die.

4. An ear tag according to claim 3 wherein the tip of the prick punch, when fully inserted in the first punch element, projects from the ridge of the end piece.

5. An ear tag according to claim 3 wherein a wall of the frustoconical cavity of the end piece forms an angle of between 40° and 60° with a longitudinal axis of the prick punch.

6. An ear tag according to claim 2 wherein the tip of the removable prick punch in the axial channel has a tip joined to a necked portion behind said head by a shoulder orthogonal to a longitudinal axis of the prick punch shaft.

7. An ear tag according to claim 2 wherein the prick punch is provided, at an end thereof which is opposite to the tip, with a mounting part for affixing the prick punch to a jaw of an applicator pliers.

8. An ear tag according to claim 1 comprising a part with the female portion and a part with the male portion, said parts bearing identifying means wherein:

the axial channel extends emerging through the second panel and the first punch element;

the organic matter sampling device, mounted in a manner that enables it to move freely within the channel of the male punch and being separable therefrom, comprises a hollow needle at one end a mounting for fixing of said sampling device on a jaw of an applicator pliers.

9. An ear tag according to claim 8 wherein the end of the hollow needle is sharp and protrudes from the end of the first punch element so that it can pierce the ear wall and cut out the organic matter during the passage of the male punch towards the female head, and after the first punch element and female head have been locked together, the sampling device is extracted from the axial channel carrying with it the organic matter.

10. An ear tag according to claim 8 wherein at least one of the parts of the male or female portions is a panel, the identifying means associated with said portion being borne on said panel.

11. An ear tag according to claim 2 or 8 wherein the identifying means are visual means.

12. An ear tag according to claim 2 or 8 wherein at least one of the identifying means includes a transponder, with an electronic number, the transponder being attached to one of the male or female portions and/or to one of the first and second panels.

13. An ear tag according to claim 1 wherein the sampling device has a panel provided with identifying means corresponding to those on the male and female portions of the tag.

14. An ear tag according to claim 1 wherein the sampling device has on its upper part means to connect it, whether in a secured manner or not, with a receptacle in which at least the end of the sampling device and the sample of organic matter is housed.

15. An ear tag according to claim 14 wherein the receptacle carries an identifying means.

16. An ear tag according to claim 15 wherein the identifying means comprises a transponder, with an electronic number, is attached to the receptacle.

* * * * *

UNITED STATES PATENT AND TRADEMARK OFFICE
CERTIFICATE OF CORRECTION

| | | |
|---|---|---|
| PATENT NO. | : 6,968,639 B2 | Page 1 of 1 |
| APPLICATION NO. | : 10/473476 | |
| DATED | : November 29, 2005 | |
| INVENTOR(S) | : Destoumieux | |

It is certified that error appears in the above-identified patent and that said Letters Patent is hereby corrected as shown below:

Col. 7, Line 4, Claim 6, please delete "shaft".

Signed and Sealed this

Twenty-second Day of May, 2007

JON W. DUDAS
*Director of the United States Patent and Trademark Office*